Figure 1:
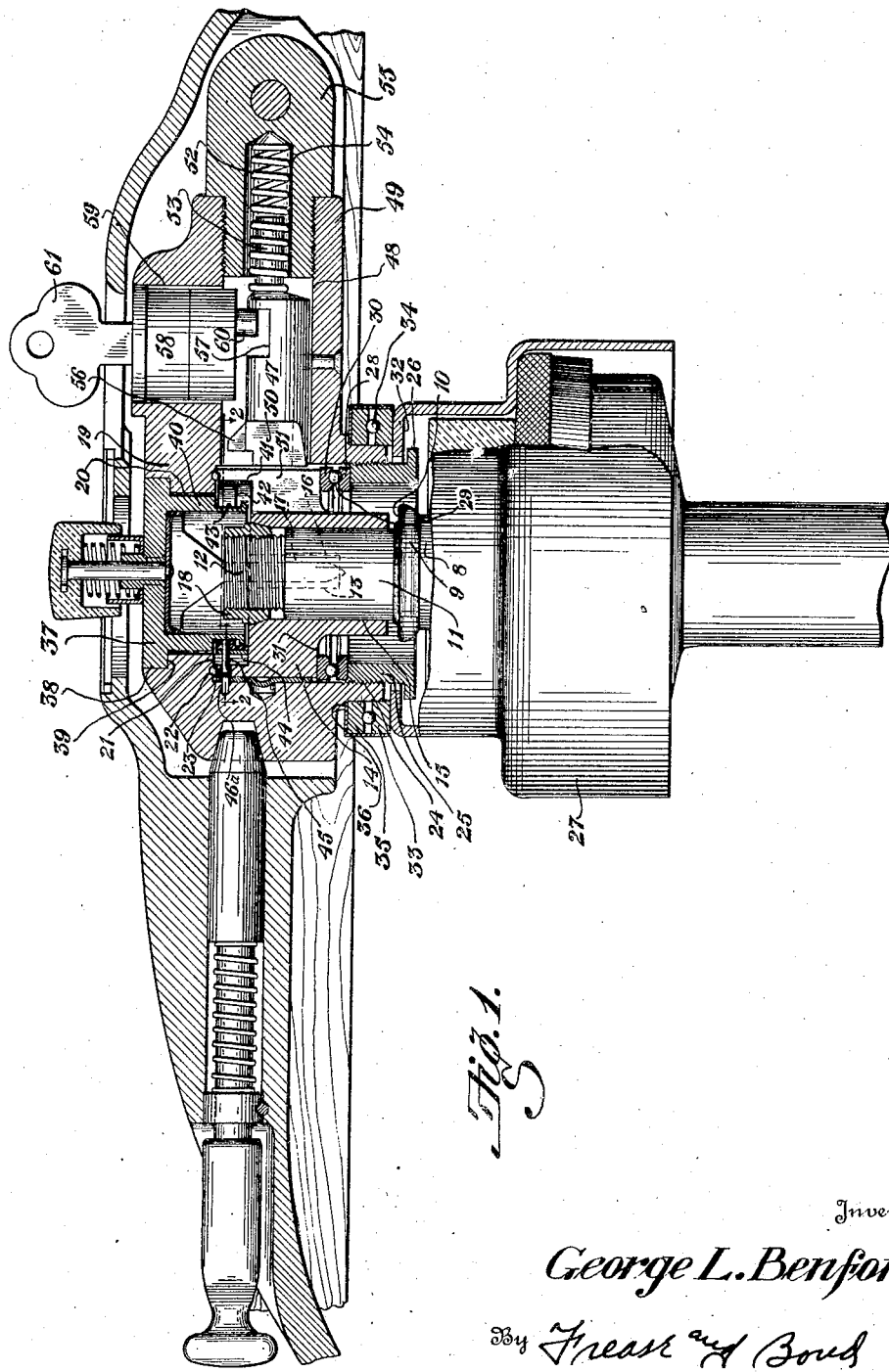

Aug. 17, 1926.　　　　　　　　　　　　　　　　　　　1,596,230
G. L. BENFORD
STEERING WHEEL LOCK
Filed March 29, 1924　　　　　2 Sheets-Sheet 1

Inventor
George L. Benford.
By Frease and Bond
Attorneys

Aug. 17, 1926.
G. L. BENFORD
1,596,230
STEERING WHEEL LOCK
Filed March 29, 1924     2 Sheets-Sheet 2
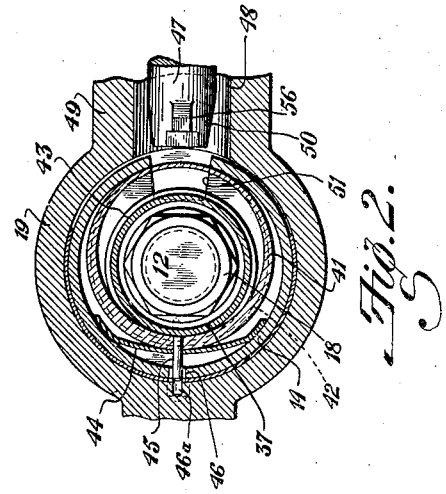
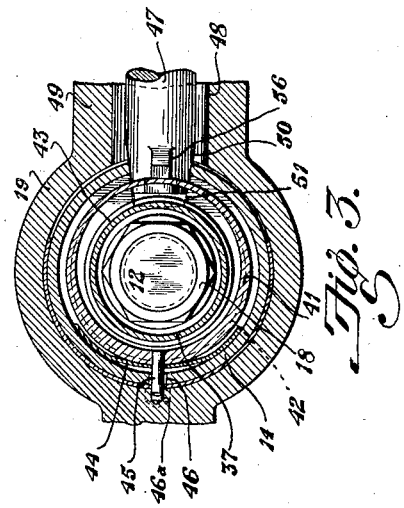
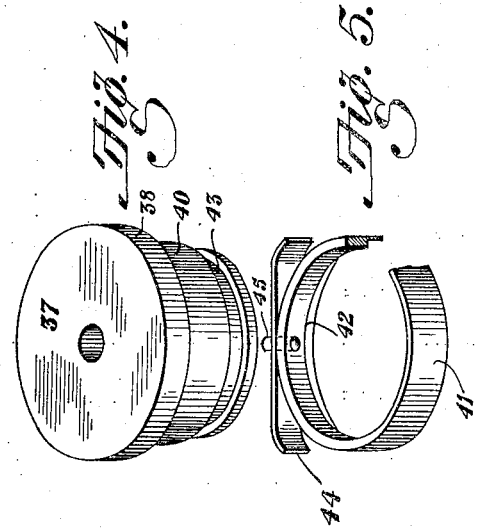
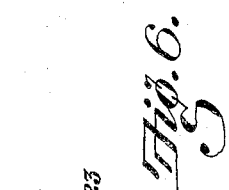
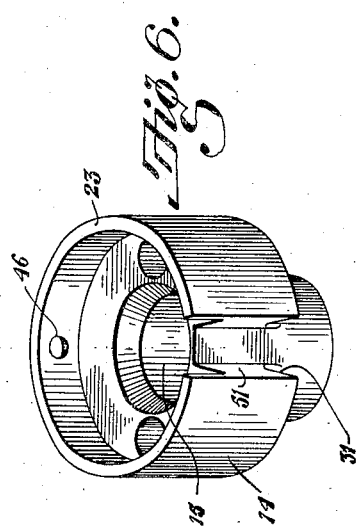
Inventor
George L. Benford.
By Frease and Bond
Attorney Patented Aug. 17, 1926.

1,596,230

UNITED STATES PATENT OFFICE.

GEORGE L. BENFORD, OF SPENCER, OHIO, ASSIGNOR TO THE SPENCER MANUFACTURING COMPANY, OF SPENCER, OHIO, A CORPORATION OF OHIO.

STEERING-WHEEL LOCK.

Application filed March 29, 1924. Serial No. 702,806.

The invention relates to a steering wheel journaled on the end of a steering post of a motor vehicle, having means for normally stopping the rotation of the wheel on the post, and means for releasing the stopping means and locking the same in released position, to render the wheel inoperative for steering purposes.

The present invention is an improvement upon the construction disclosed in the application of John B. Childe, Lee E. Dilts and Otto Kuepfer, Serial No. 571,353, filed June 28, 1922.

Steering wheels of this general type include a journal head fixed upon the steering post by means of a nut, and a corresponding member in the hub of the wheel, with a bolt in the wheel normally engaging the head to stop rotation of the wheel thereon and a cylindric lock operable with a key for withdrawing and locking the bolt from engagement with the head, and permitting the rotation of the wheel thereon.

In the application above referred to, a cap is provided over the nut arranged to be automatically locked against removal when the wheel is rotatable upon the post and adapted to be disconnected by turning the cap to a certain position when the wheel is locked upon the steering post.

The object of the present invention is to provide means whereby the cap may be lifted out of the hub of the wheel at any time when the wheel is locked upon the steering post, without the necessity of turning the cap to a certain position before the same may be removed.

The invention as embodied in a wheel hinged to its bearing hub at one side thereof in well known manner, is illustrated in the accompanying drawings, forming part hereof, in which—

Figure 1 is an axial section through the hub portion of a steering wheel and the head portion of a steering post showing details of the improvement;

Fig. 2, a section on the line 2—2, Fig. 1;

Fig. 3, a view similar to Fig. 2, showing the wheel locked upon the steering post;

Fig. 4, a detached perspective view of the nut cover;

Fig. 5, a perspective view of the locking ring and spring; and

Fig. 6, a perspective view of the journal head.

Similar numerals of reference indicate corresponding parts throughout the several figures of the drawings.

A steering post 8 is provided near its upper end with an annular flange 9 forming an annular shoulder 10 above which extends a stem 11 having a screw shank 12 on its end and being provided with a longitudinal keyway 13 in one side.

A journal head 14 provided with an axial bore 15 fitting the stem 11, and a key-way 16, is mounted upon the steering post and is secured from rotation thereon by a key 17 engaged in the key-ways, and clamped by a nut 18 screwed upon the shank of the post.

The hub 19 of the wheel is journaled upon the journal head 14, being provided with the axial bore 20 surrounding the head. Near the upper end of the hub an internal annular shoulder 21 is provided bearing on the balls 22 operating in a raceway 23 in the peripheral portion of the upper end of the journal head.

A screw thread 24 is provided in the lower end of the axial bore 20 of the hub, for receiving the threaded coupling 25 having the annular flange 26 at its lower end for retaining the bell shaped shield 27.

The coupling 25 is adapted to turn against the ring 28 provided with a raceway to receive the balls 29, a similar ring 30 being supported upon the balls and held in engagement with the peripheral shoulder 31 of the journal head.

The inturned annular flange 32 at the upper end of the bell shaped shield, extends above the flange 26 upon the coupling and engages a raceway ring 33, holding the same against the balls 34 which rotate in the raceway ring 35 engaged against the shoulder 36 upon the under side of the wheel hub.

The upper end of the journal head 14 and the wheel hub 19 are annularly recessed to receive a cap 37 which has a peripheral flange 38 on its upper end bearing upon an annular shoulder 39 formed in the recess of the hub, in which it is freely revoluble and has a cylindric wall 40 extending downward freely around the sides of the nut 18, and is so proportioned that the body of the cap is freely spaced above the nut when its peripheral flange is seated on the shoulder 39 of the hub; so that the cap cannot be clamped into contact with the nut or journal head.

Means for normally retaining the cap in position may include a ring 41 provided with an internal, annular shoulder 42 for engagement with the annular groove 43 located near the lower end of the cap and arranged to be normally held in engagement therewith by the bow spring 44, which is preferably connected at its central portion to the ring, as by the stud 45, provided for engagement with an aperture 46 in the journal head and a socket 46ᵃ in the wheel hub, thus preventing rotation of the ring with reference to the journal head.

The spring is normally bowed so as to protrude outside of the peripheral groove in the cap at its ends, while the central portion of the spring is normally engaged with the ring 41, holding the flange 42 thereof in the annular groove of the cap, thereby preventing a withdrawal of the cap from the journal head and wheel hub recess.

The wheel hub 19 is normally stopped from turning upon the journal head 14 by a bolt 47, operably mounted in a bore 48, provided in a lateral tubular extension 49 of the hub, so that the inner end 50 of the bolt may enter a radial slot 51 provided in one side of the journal head and be held therein by action of the compression spring 52, coiled around a stem 53 and extended into a socket 54 provided in a plug 55 screwed into the outer end of the bolt bore in the hub extension.

A transverse flange 56 provided on the upper side of the bolt, near its forward end, is so positioned as to enter the annular channel in the recess of the journal head when the inner end of the bolt is engaged with the head.

In this position, the flange 56 will engage the ring 41, pressing the same against the action of the spring 44 into concentric position with relation to the cap 48, holding the annular shoulder 42 upon the ring, out of the annular groove 43 in the cap, whereupon the cap can be readily lifted out of the hub and head recesses, whenever it is necessary or desirable to have access to the nut 18, by which the journal head is secured to the steering post.

The bolt 47 is provided with a transverse slot 57 in its upper side, and a lock 58 is mounted in a cylindric recess 59 in the hub extension. The lock is provided with a wrist pin 60 and is adapted to be operated by a key 61 for moving the bolt outward from engagement in the bore of the journal head; whereupon the key may be withdrawn and the bolt can only be reengaged with the journal head by the use of the key.

When the bolt is thus operated, the flange 56 is withdrawn from engagement with the ring 41, permitting the bow spring 44 to press the ring into engagement with the annular recess of the cap, so that it is impossible to remove the cap from the hub and head recesses, without reentering the key and operating the bolt into normal engaging position.

From the above, it will be obvious that the cap may be removed at any time when the wheel is locked upon the journal head, without the necessity of turning the cap to any particular position, while the cap is always automatically locked against removal when the bolt is withdrawn.

I claim:—

1. A steering post, a journal head, a nut securing the head on the post, a rotatable hub around the head, a slidable bolt in the hub for stopping its rotation on the head, a cap recessed in the hub and head bearing on the hub and freely revoluble therein, and enclosing the nut and head free of the same, an annular channel in the head having an overhanging shoulder, an external annular groove in the cap, a locking ring loosely mounted in said annular channel, means for normally pressing one side of the ring into the annular groove in the cap, there being a flange on the bolt for pressing the ring out of the groove when the bolt is operated.

2. A steering post, a journal head, a nut securing the head on the post, a rotatable hub around the head, a slidable bolt in the hub for stopping its rotation on the head, a cap recessed in the hub and head bearing on the hub and freely revoluble therein, and enclosing the nut and head free of the same, an annular channel in the head having an overhanging shoulder, an external annular groove in the cap, a locking ring loosely mounted in said annular channel provided with an internal annular shoulder for engagement in the external annular groove in the cap, means for normally pressing one side of said shoulder into the annular groove in the cap, there being a flange on the bolt for pressing the ring out of the groove when the bolt is operated.

3. A steering post, a journal head, a nut securing the head on the post, a rotatable hub around the head, a slidable bolt in the hub for stopping its rotation on the head, a cap recessed in the hub and head bearing on the hub and freely revoluble therein, and enclosing the nut and head free of the same, an annular channel in the head having an overhanging shoulder, an external annular groove in the cap, a locking ring loosely mounted in said annular channel, a bow spring for normally pressing one side of the ring into the annular groove in the cap, the head having a socket and a stud connecting the bow spring to the ring and extending into the socket, there being a flange on the bolt for pressing the ring out of the groove when the bolt is operated.

In testimony that I claim the above, I have hereunto subscribed my name.

GEORGE L. BENFORD.